Figure 1:
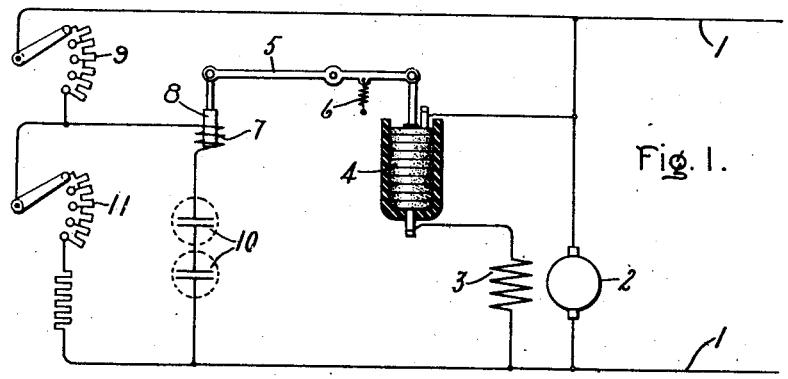

W. S. BRALLEY.
VOLTAGE REGULATOR.
APPLICATION FILED JULY 30, 1908.

1,077,792.

Patented Nov. 4, 1913.

Witnesses:
George W. Tilden
J. Ellis Elem

Inventor:
Walter S. Bralley,
by Albert G. Davis
Att'y.

UNITED STATES PATENT OFFICE.

WALTER S. BRALLEY, OF SCHENECTADY, NEW YORK, ASSIGNOR TO GENERAL ELECTRIC COMPANY, A CORPORATION OF NEW YORK.

VOLTAGE-REGULATOR.

1,077,792.   Specification of Letters Patent.   Patented Nov. 4, 1913.

Application filed July 30, 1908. Serial No. 446,102.

*To all whom it may concern:*

Be it known that I, WALTER S. BRALLEY, a citizen of the United States, residing at Schenectady, county of Schenectady, State of New York, have invented certain new and useful Improvements in Voltage-Regulators, of which the following is a specification.

This invention relates to devices for maintaining a constant potential on an electrical distribution system by automatically varying the resistance of the generator field circuit in accordance with the variations in line voltage, decreasing said resistance as said voltage drops, and vice versa.

It has been found that the most efficient regulation can be secured by quickly shifting the field resistance back and forth from a point considerably below what is actually necessary to produce the proper result, to a point considerably above such requirement. According to this principle, for example, if a voltage should tend to rise above normal the regulator should at once decrease the excitation of the generator to an amount greater than is necessary to restore the voltage to the normal, thereby instantly checking the rise of voltage and tending to depress the voltage below normal. Just as soon, however, as the voltage has passed the normal value and tends to fall below the same, the regulator should act to increase the field excitation in the same manner to an amount greater than necessary to restore it to normal. This mode of regulation necessitates a frequent operation of the regulator, but it results in a fairly steady charge of potential in the main line to meet the changes in load.

In order to produce considerable alteration of resistance in the generator field circuit, I employ means for amplifying the effect of predetermined variations of voltage upon the regulator. This means may comprise one or more electrolytic cells of the aluminum type across the line and acting to vary the potential in the winding of a solenoid which controls a rheostat in the field circuit. The electrolytic cell has the property of preventing any substantial flow of current up to a critical voltage of about 420 volts, at which point its resistant film of aluminum hydroxid suddenly gives way and permits a free flow of current. If the voltage drops below 420, the film instantly reforms and shuts off the current. It is thus possible to get a wide range in current flow with a small variation in voltage, for if the cell is operated near its critical voltage a slight increase of potential across its terminals will result in a large increase of current through the cell, and a slight decrease of potential across its terminals will be accompanied with corresponding large decrease of current through the cell. In other words, the changes in the value of the currents through a cell of this kind is greater than in a dead resistance, such as an iron rheostat, with the same change of voltage. This characteristic of a cell of this type enables me to impress upon the aforesaid solenoid sudden and considerable changes of current which act correspondingly on the field rheostat and produce sudden and considerable changes in the excitation of the generator field.

Figure 2:
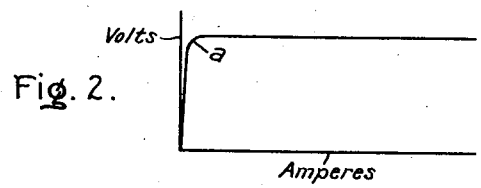
Figure 3:
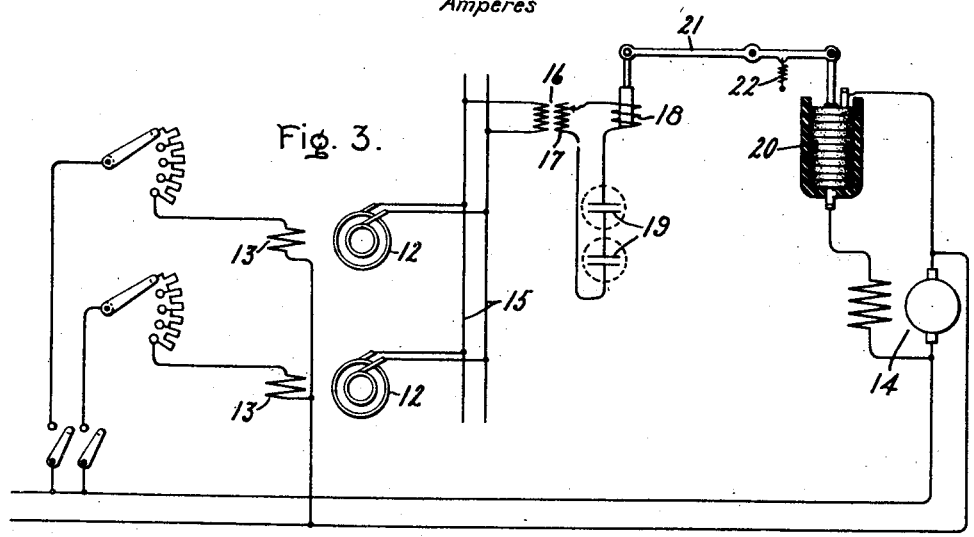
Figure 4:
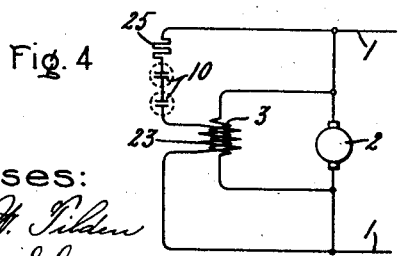

In the accompanying drawing Figure 1 is a diagram showing one embodiment of my invention in a direct current system, Fig. 2 is the characteristic curve of an electrolytic cell, Fig. 3 shows the invention applied to an alternating current system, and Fig. 4 shows a modification.

Referring first to Fig. 1, the main lines 1 are supplied with current from the generator 2, whose shunt field winding 3 is in series with a rheostat, preferably a pile of carbon plates 4 with a lever 5 for varying the pressure on them and thereby varying their resistance. The lever is urged down upon the plates by a spring 6, but can be lifted by a sucking solenoid 7 whose core 8 is attached to said lever. The solenoid is connected across the line in series with a variable resistor 9 and one or more electrolytic cells 10. A second adjustable resistor 11 is in series with the resistor 9 and is parallel with the cells 10. The object of this arrangement of solenoid cells and resistors is to get a variation in the potential impressed upon the solenoid and cell circuit. By cutting out all of the resistor 9, the solenoid and cells will be connected directly across the line, but by cutting in the resistor 9 and varying resistor 11 the point at which the solenoid and cell circuit is connected can be given a potential lower than that of the line. The resistance of the resistor 9 and the solenoid should be small as compared with that of the cells, probably about five per cent. of the cell resistance. The smaller it is, the more sensitive will be the regulator.

Fig. 2 shows the characteristic volt-ampere discharge of an aluminum cell, which rises with only a slight leakage current to a critical value of about 420 volts at the point $a$ where the resistant film suddenly opens and permits a free flow of current. Any drop of the voltage below this critical point causes the film to close again and oppose its full resistance to the current. One, two or more cells may be used in series as may be required by the line voltage. This sudden opening and closing of the solenoid circuit as the voltage fluctuates produces sudden and considerable changes in pressure on the pile of carbon plates and thus correspondingly varies the current in the field circuit. An increase in line voltage sufficient to carry it up over the unstable point $a$ of the curve in Fig. 2 will relieve the pressure on the carbon plates and increase the field circuit resistance, cutting down the field excitation and reducing the voltage at the generator terminals, and vice versa.

Fig. 3 shows the application of the invention to alternating current generators 12 whose field coils 13 are energized by an exciter 14. The voltage on the main bus bars 15 is stepped down on a potential transformer 16, whose secondary 17 is in circuit with the solenoid 18 and the electrolytic cells 19, the carbon plate resistor 20 in the exciter field circuit being controlled by the solenoid through the lever 21 and spring 22, as in Fig. 1. The voltage impressed upon the solenoid and cell circuit may be varied by taps over the secondary 17 of the potential transformer.

Fig. 4 shows a modification in which the generator field has a differential winding 23 in series with electrolytic cells 10 connected across the line. A resistor 25 may be inserted in the cell circuit. When the line voltage becomes sufficiently high to break down the film in the cells, the flow of current in the differential winding opposes the magnetizing effect of the main winding 3 and thereby reduces the output of the generator.

What I claim as new and desire to secure by Letters Patent of the United States, is,—

1. In combination with an electric generator, a circuit parallel to the circuit including the field winding thereof, an electrolytic cell of the aluminum type in said parallel circuit, and means for causing the variation of current in said parallel circuit to vary the magnetization produced by the field winding.

2. The combination with an electric generator, of a circuit parallel to the circuit including the field winding thereof, an electrolytic cell of the aluminum type in said parallel circuit, and a coil in series with said cell adapted to vary the magnetizing effect of said field winding.

3. The combination with an electric generator, of a rheostat in its field circuit, a circuit in parallel with said field circuit including an electrolytic cell of the aluminum type, and means in circuit with said cell for controlling said rheostat.

4. The combination with an electric generator, of a rheostat in its field circuit, a circuit in parallel with said field circuit including an electrolytic cell of the aluminum type, a solenoid in series with said cell and a means whereby said solenoid can operate said rheostat.

5. The combination with an electric generator, of a rheostat in its field circuit, and a circuit in parallel with said field circuit including an electrolytic cell of the aluminum type, a solenoid and a resistor in series with said cell, said solenoid controlling said rheostat, and a second resistor in series with the first mentioned resistor and in parallel with said cell and solenoid.

6. In combination, a dynamo-electric machine, an electrolytic cell of the aluminum type having impressed thereon a voltage proportional to the voltage of said machine, and means responsive to the current through said cells for varying the excitation of said machine.

7. In combination, a dynamo-electric machine, a field winding for said machine, a resistance included in circuit with said field winding, an electrolytic cell of the aluminum type having impressed thereon a voltage proportional to the voltage of said machine, and means responsive to the current through said cells for controlling said resistance.

In witness whereof, I have hereunto set my hand this 29th day of July, 1908.

WALTER S. BRALLEY.

Witnesses:
BENJAMIN B. HULL,
HELEN ORFORD.